United States Patent
Fränkle et al.

(10) Patent No.: US 7,029,510 B2
(45) Date of Patent: Apr. 18, 2006

(54) PARTICLE FILTER WITH CARBON DEPOSIT COMBUSTION FOR DIESEL ENGINES

(75) Inventors: Gerhard Jürgen Fränkle, Remshalden (DE); Hermann Josef Schulte, Menden (DE); Hans Peter Frisse, Herzogenrath (DE); Carsten Jutka, Menden (DE); Jochen Koll, Amsberg (DE); Klaus Schrewe, Rothen (DE)

(73) Assignee: HJS Fahrzeugtechnik GmbH & Co., Menden (DE)

( * ) Notice: Subject to any disclaimer, the term of this patent is extended or adjusted under 35 U.S.C. 154(b) by 256 days.

(21) Appl. No.: 10/739,786

(22) Filed: Dec. 18, 2003

(65) Prior Publication Data

US 2004/0128960 A1    Jul. 8, 2004

Related U.S. Application Data (63) Continuation-in-part of application No. PCT/EP02/06724, filed on Jun. 18, 2002.

(30) Foreign Application Priority Data

| Jun. 18, 2001 | (DE) | 101 28 936 |
| Jun. 18, 2001 | (DE) | 101 28 938 |
| May 25, 2002 | (DE) | 102 23 452 |

(51) Int. Cl.
*B01D 46/00* (2006.01)

(52) U.S. Cl. ......... 55/282.3; 55/385.3; 55/497; 55/498; 55/521; 55/523; 55/529; 55/DIG. 10; 55/DIG. 30; 96/425; 96/426; 60/311

(58) Field of Classification Search ......... 55/282.2, 55/282.3, 361, 385.3, 497, 498, 499, 501, 55/521, 523, 529, DIG. 10, DIG. 30; 96/424, 96/425, 426; 60/311
See application file for complete search history.

(56) References Cited

U.S. PATENT DOCUMENTS

| 4,056,375 | A | * | 11/1977 | Ringel et al. | ......... 55/521 |
| 4,154,587 | A | | 5/1979 | Gerok | |
| 4,359,864 | A | | 11/1982 | Bailey | |
| 4,562,039 | A | | 12/1985 | Koehler | |
| 4,641,496 | A | | 2/1987 | Wade | |
| 4,924,561 | A | | 5/1990 | Yoneyama | |
| 4,975,099 | A | * | 12/1990 | Kaser et al. | ......... 55/282.3 |
| 5,259,190 | A | * | 11/1993 | Bagley et al. | ......... 55/523 |
| 5,782,941 | A | | 7/1998 | Matsunuma et al. | |
| 5,851,250 | A | * | 12/1998 | Sugie et al. | ......... 55/523 |
| 5,961,931 | A | * | 10/1999 | Ban et al. | ......... 55/521 |
| 6,013,118 | A | * | 1/2000 | Matsunuma et al. | ......... 55/282.3 |

FOREIGN PATENT DOCUMENTS

| DE | 36 37 516 | | 4/1988 |
| DE | 36 37 516 C1 | * | 4/1988 |
| DE | 37 23 544 | | 1/1989 |

(Continued)

Primary Examiner—Jason M. Greene
(74) Attorney, Agent, or Firm—Klaus J. Bach (57) ABSTRACT

In a particle filter with carbon (soot) deposit combustion for Diesel engines comprising a filter with filter areas of sinter metal through which exhaust gases from the Diesel engine are conducted to remove the soot therefrom, the soot collected at the raw gas side of the filter surfaces is burned off by radiation heaters which are arranged so as to radiate between wedge-like filter pockets of the particle filter such that selected areas of the filter are heated to initiate combustion of the soot on the filter surfaces.

13 Claims, 4 Drawing Sheets

| | FOREIGN PATENT DOCUMENTS | |
|---|---|---|
| DE | 38 21 143 | 3/1989 |
| DE | 38 07 539 | 9/1989 |
| DE | G 90 10 910.4 | 12/1990 |
| DE | 42 43 990 | 7/1994 |
| DE | 44 03 450 | 4/1995 |
| DE | 195 20 146 | 6/1996 |
| DE | 195 03 067 | 8/1996 |
| DE | 198 10 738 | 4/1999 |
| DE | 198 55 092 | 5/2000 |
| EP | 59 037224 | 2/1984 |
| EP | 36 08 801 | 9/1987 |
| EP | 0 650 551 | 5/1995 |
| EP | 0 485 974 | 1/1996 |
| EP | 0 837 228 | 4/1998 |
| EP | 0 849 444 | 6/1998 |

* cited by examiner

PARTICLE FILTER WITH CARBON DEPOSIT COMBUSTION FOR DIESEL ENGINES

This is a Continuation-in-part Application of International Application PCT/EP02/06724 filed Jun. 18, 2002 and claiming the priority of German applications 101 28 938.3, 102. 28 936.7 and 102 23 452.3 filed Jun. 18, 2001, Jun. 18, 2001 and May 25, 2002, respectively.

BACKGROUND OF THE INVENTION

The invention resides in a particle filter with carbon deposit or soot combustion for Diesel engines, comprising a filter body having filter areas of sinter metal through which the engine exhaust gas is conducted from the upstream raw gas side to the downstream clean gas side for removing particles from the exhaust gas and electric heaters are arranged at the downstream side for burning off the particle or soot deposits on the sinter metal filter areas.

Particle filters of the above-mentioned type are known from DE 198 10 738 C1. They operate with filter pockets which are closed along their outer circumference and which are stacked on top of one another normal to the pocket plane and in communication with one another in the end areas of their central pocket openings to form a filter body. Raw gas is conducted through the pocket openings centrally into this filter body and hot gases of a burner flow in the direction of the pocket planes between the pockets so that hot gases and fresh gases mix between the pockets and heat the outside of the pocket walls sufficiently for the combustion of carbon deposits thereon.

Particle filters of this type are actually in use and satisfy the functional requirements but, because of their design and the use of a burner, they are expensive and also space-consuming so that their use, particularly in exhaust gas systems of passenger cars, is limited.

In another known particle filter with carbon deposit combustion (EP 0 650 551 B1) a filter body of a sinter metal, on which the carbon or soot is deposited, is electrically heated. For this purpose, a spray electrode is disposed, in the raw gas flow direction, ahead of the filter body, by way of which the particles are charged or, respectively agglomerated and deposited on the filter surfaces mechanically as well as electrostatically since the filter body acts as a collector electrode. For the regeneration of a filter charged in this way, an electric current is from time to time conducted over the filter body, whereby the filter body, acting as a resistance element, is heated to ignition temperature.

There is a multitude of additional particle filters for Diesel engines known, which are electrically heated for the combustion of soot, some in connection with filter bodies which include filter surfaces of sinter material (DE 195 20 146 C1, EP 0 849 444 A2) some with other types of metallic filter bodies (EP 0 837 228 A2) and some with ceramic filter bodies, particularly in the form of honeycomb filter bodies (DE 36 08 801 A1, EP 0 485 974 B1). In some of these filters, the electrical heating in the raw gas inlet area is achieved by resistance wires disposed in the entrance channels with the aim that, after ignition of the soot at the beginning of the channel, the flame front proceeds toward the end of the channel, that is, that the combustion initiated at the raw gas side proceeds following the gas flow toward the clean gas side. In addition to, or independent of, the soot combustion enhanced by the electrical heating, some chemical compounds may be employed which enhance the reaction. Also, motor control means for increasing the temperature of the exhaust gases and engine operating procedures for improving the combustion of the soot may be used.

It is the object of the invention to improve particle filters with carbon or soot combustion for Diesel engines to the point that the advantages which sinter metal filters structures have for particle deposition and the regeneration by combustion of the carbon or soot can be utilized and those filters operate with minimal energy consumption, a high degree of soot combustion and can be manufactured advantageously and economically.

SUMMARY OF THE INVENTION

In a particle filter with carbon (soot) deposit combustion for Diesel engines comprising a filter with filter areas of sinter metal through which exhaust gases from the Diesel engine are conducted to remove the soot therefrom, the soot collected at the raw gas side of the filter surfaces is burned off by radiation heaters which are arranged so as to radiate between wedge-like filter pockets of the particle filter such that selected areas of the filter are heated to initiate combustion of the soot on the filter surfaces.

With such a filter only a part, particularly a small part, of the sinter metallic filter area is electrically heated with a contact-free heat input from the raw gas side so that excellent conditions are provided for the ignition of the soot, particularly with additional measures, be they engine-based or of another type, for increasing the temperature at the raw gas side or for enhancing the combustion together with other, for example, chemical means. They may become effective directly with the heat input and result under certain conditions in an improved combustion of the soot coating because of the ignition initiated by the electrical heating. The contact-free electrical heating improves particularly the design conditions with respect to the flexibility of the arrangement, the space requirements, a trouble-free long-term operation and the electrical operational safety. Furthermore, the design freedom and the expenses for the filter body are positively affected since the filter can be manufactured independently of the heat source that is a modular design may be provided. Particularly, also the extreme thermal stresses during burning the soot off the filter areas and the effects thereof on the filter areas and on the electric heat sources and their design can be mitigated.

The invention therefore provides a solution which reduces construction expenses and heat energy requirements and which offers advantageous possibilities for an effective utilization of other measures that enhance carbon deposit and soot combustion since the contact-free introduction of heat energy is advantageous for the design and the accommodation of the heat source, also with regard to needed safety measures such as insulation.

In accordance with the invention, the contact-free heating is achieved by the use of a radiation heater for example by at least one laser radiator. In this way, the high area-specific heat energy input needed for a safe ignition can be achieved with small energy requirements without directly contacting the filter areas. If appropriate, reflectors may be used in connection with conventional radiation heaters. In addition to the reflection effects, such reflective shields may also be advantageous for affecting the soot deposition on the filter surfaces in the irradiated area by guide or baffling functions, and, in this way, improve the conditions for the ignition and safe combustion of the soot deposits without contacting the filter body.

The solution according to the invention may be used advantageously in connection with various types of filter bodies but it is particularly suitable for filter bodies which include wedge-like filter pockets which have openings facing a common plane. The raw gas flows toward the closed wedge-like filter end areas, which are formed by filter pockets with sinter metal filter areas. The filter pockets project toward the raw gas flow which is directed into the filter pockets through the wedge-like pocket walls. The cleaned gas then leaves the filter through the respective filter openings.

Particularly expedient are wedge filter pockets whose front openings are triangular in cross-section and have side surfaces, which are formed by the legs and which converge in the longitudinal gas flow direction as well as in the axial direction of the triangular cross-section so as to form end edges. In this way, large filter areas and filter bodies with a uniform circumferential contour can be obtained. This may be a circular or an oval shape. But also filters with irregular contours can be constructed in this way. For an arrangement according to the invention the conditions provided by circular or oval filter contours or similar filter contours are particularly advantageous.

In an especially advantageous embodiment, such a sinter metal particle filter whose clean gas-side pocket openings at the front of the filter pockets have triangular cross-section sand are disposed in a common plane. The filter pockets extend wedge-like toward a common center and also wedge-like in a longitudinal direction, that is, axially toward the raw gas side. At the raw gas side, the filter pockets are electrically heated in a contact-free manner in the area near the pocket opening plane The heating energy is concentrated on a sector of the filter body which encompasses several filter pockets. The heating energy is directed to at least one filter pocket. The contact-free input that is radiation of the heat source is directed toward—with respect to the center of the filter body—outer longitudinal end areas of the filter pockets. Also the respective side surfaces of the filter pockets may be heated as well as the triangular backside which extends longitudinally between the side walls. The heating of the rear area is particularly advantageous especially with regard to the arrangement of the respective heating elements in relation to the filter body.

For reason of space and also because of the possibility to concurrently heat opposite filter surfaces however, the heating elements may expediently also be so arranged that they extend into the raw gas spaces between adjacent filter pockets.

In connection with the contact free operation of the heat source, it is expedient if the heat application is limited to a small-area ignition zone with specific heat inputs of 20–100 kW/m$^2$, particularly about 60 kW/m$^2$. The ignition zone is preferably the rear area in the longitudinal extension of the heated filter pockets. Based on the whole filter area, a specific heat input in the range of 0.8–1.6 kW/m$^2$ is then applied.

With a concentration of the heat energy applied to small ignition surface areas, safe ignition is ensured with short heating periods of a few minutes. Then the combustion of the soot continues depending on the amount of soot deposits over a large part of the filter area by flame front propagation in the soot layer. As a result, with the particle filter according to the invention, the need of heating energy supplied by external heating is small that is it is in a range compatible with the capacity of electric power generating systems of passenger cars.

Particularly the concentration of the heat input on a partial-length of the filter pocket near the plane of the pocket openings has been found to be advantageous. Surprisingly, it has been found that here not only the conditions for flame propagation from a small ignition area are particularly advantageous but that, starting in this area, the soot is burnt off by flame propagation in the soot layer very effectively against the gas flow direction.

Considering, in particular, that in accordance with the invention, distributed over the circumference of the filter, several heating sources may be provided so as to direct heat energy onto the respective filter areas and that the heat sources may be concurrently energized or activated in a timed manner, the heat input efficiency can be controlled such that the required filter area is minimized. The wedge-type filter structure is particularly suitable for such a procedure and the use of independently controlled and energized heat sources improves also the operational safety.

Also, filters are generally designed in such a way that, with clean filter surfaces, that is without soot covering the filter surfaces, under full engine load and high engine speed, a predetermined maximum back pressure should not be exceeded. Taking into consideration the maximum admissible exhaust gas back-pressure, there is generally no need for a large filter area, particularly since the internal combustion engine operates mostly at relatively low speeds. A certain amount of soot may therefore remain on the filter surfaces, since, with a filter designed basically for a predetermined back-pressure (for example, 200 mbar) at full load and nominal speed, only a limited increase of the exhaust gas back pressure (for example to about 800 mbar) is to be expected if the clean filter surface area is reduced (for example by 50%) and the engine speed is reduced from the nominal engine speed (for example, to about 85–90%).

Consequently, with respect to time as well as the filter area, a relatively large range is available for regeneration purposes, especially in connection with passenger cars which, with the given traffic conditions, are generally not operated under full load and nominal engine speed. In accordance with the invention therefore the heat areas of the various filter sectors can be energized sequentially so that the combustion on these sections can be initiated sequentially in a timed manner. In this way, over the whole filter body, there may be different soot deposit amounts but the average deposit amount remains essentially the same. Also, the soot combustion by flame propagation occurs over a certain period which also helps to maintain an upper filter temperature limit.

It is therefore expedient to control the inflammation and the combustion in consideration of an acceptable remaining deposit amount wherein it is sufficient if up to about 75% of the maximally available, that is, of the design filter area is kept free of deposits.

Further possibilities for the reduction of the external heating requirements are possible in accordance with the invention by a mutual adaptation of soot combustion and engine operating procedures. These operating procedures may be required by the respective operating conditions or they may be achieved by operational control measures for the engine operation depending on the momentary operating conditions such as a controlled increase of the fuel injection amount or similar. It has been found to be particularly advantageous if, for the interaction of soot combustion and engine operation, vehicle operating conditions and/or driver behavior are taken into consideration. If the driver behavior of a vehicle is continually recorded over a certain period and continuously or intermittently taken into account, the special condition of a particular road are also included in the consideration. Since the combustion of the soot is generally not necessary at a certain point in time but only within a relatively large time interval, the soot combustion can also be enhanced in this way, that is, it can be integrated into the vehicle operation.

There are many possibilities available, which can additionally be taken into account for the soot combustion and used for reducing the required heat energy input and improving the soot combustion. The soot combustion control may consider for example the oxygen content in the exhaust gases which may be determined by way of a λ sensor, or the engine speed may be controlled by adaptation of the transmission control, the use of exhaust gas re-circulation, the admission of additional air which may be diverted from the charge air if the engine is supercharged and so on.

Additional details and features of the invention will become more readily apparent from the following description of the invention on the basis of particular embodiments with reference to the accompanying drawings.

Figure 1:
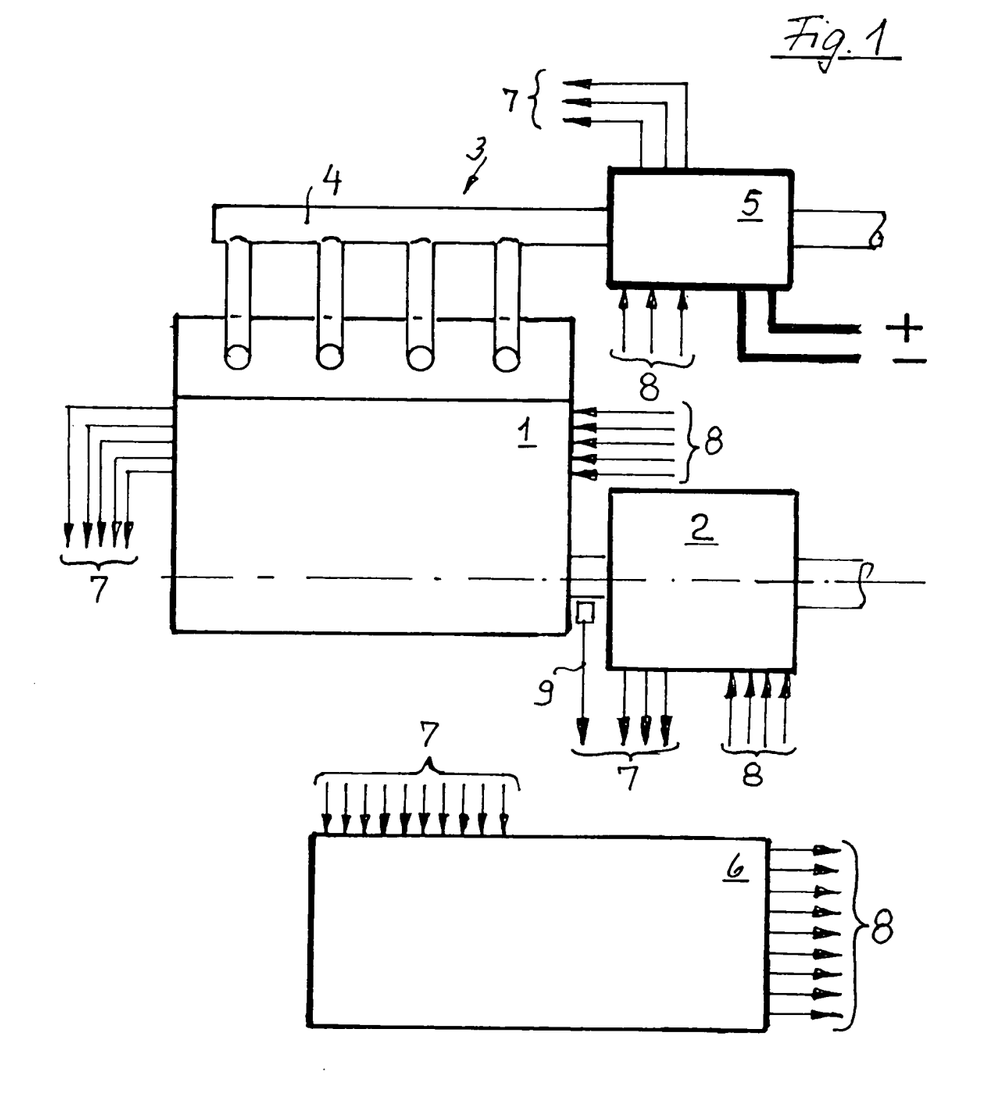
FIG. 1 shows schematically a Diesel engine with a transmission at the drive end thereof, and a particle filter operating with carbon deposit or soot combustion arranged in the exhaust gas line as well as a control device by way of which the engine and the particle filter are functionally interconnected.

In the schematic arrangement of FIG. 1 a Diesel engine 1 is shown to which a transmission 2 is attached and which includes an exhaust system 3 comprising an exhaust gas duct 4 provided with a particle filter 5 operating as a soot combustion filter. Furthermore, a control apparatus 6 is shown which may be a control computer unit. As indicated by the arrows, sensor and control signals from the Diesel engine 1, the transmission 2 and the particle filter 5 are converted in the control apparatus 6 into control signals for the operation of the engine 1, the transmission 2, the particle filter 5 and other elements (not shown) but which may also be connected to the control apparatus 6 of a vehicle which is also not shown. The signals supplied to the control apparatus 6 are indicated by the arrows 7, the signals provided by the control apparatus 6 are indicated by the arrows 8. One of the signals supplied to the control apparatus is an engine output speed signal 9. The drive unit represented in a simplified manner by the Diesel engine 1, the transmission 2 and the particle filter 5 may include, integrated into the exhaust system 3, an exhaust gas turbocharger and also a starter device in the form of a starter-generator unit. Such a starter-generator unit is driven as a generator depending on the vehicle operating conditions, particularly during braking operations in order to convert the brake energy into electrical energy, which is needed to a greater extent in connection with the arrangement according to the invention as it includes an additional electric energy consumer for the electrical heating of the particle filter. The respective electric connections of the particle filter are symbolically indicated by +/−.

By way of the control apparatus 6, furthermore, data characteristic for the behavior of the vehicles driver, particularly in connection with specific routing and traffic control conditions, road profiles and data concerning the traffic conditions, can be processed and converted to control signals, for example control signals for particular transmission shift programs and also programs controlling the operation of the particle filter. As a result for example control values can be determined and converted which control the soot combustion considering the engine and vehicle operating conditions for the time periods under surveillance.

Figure 2:
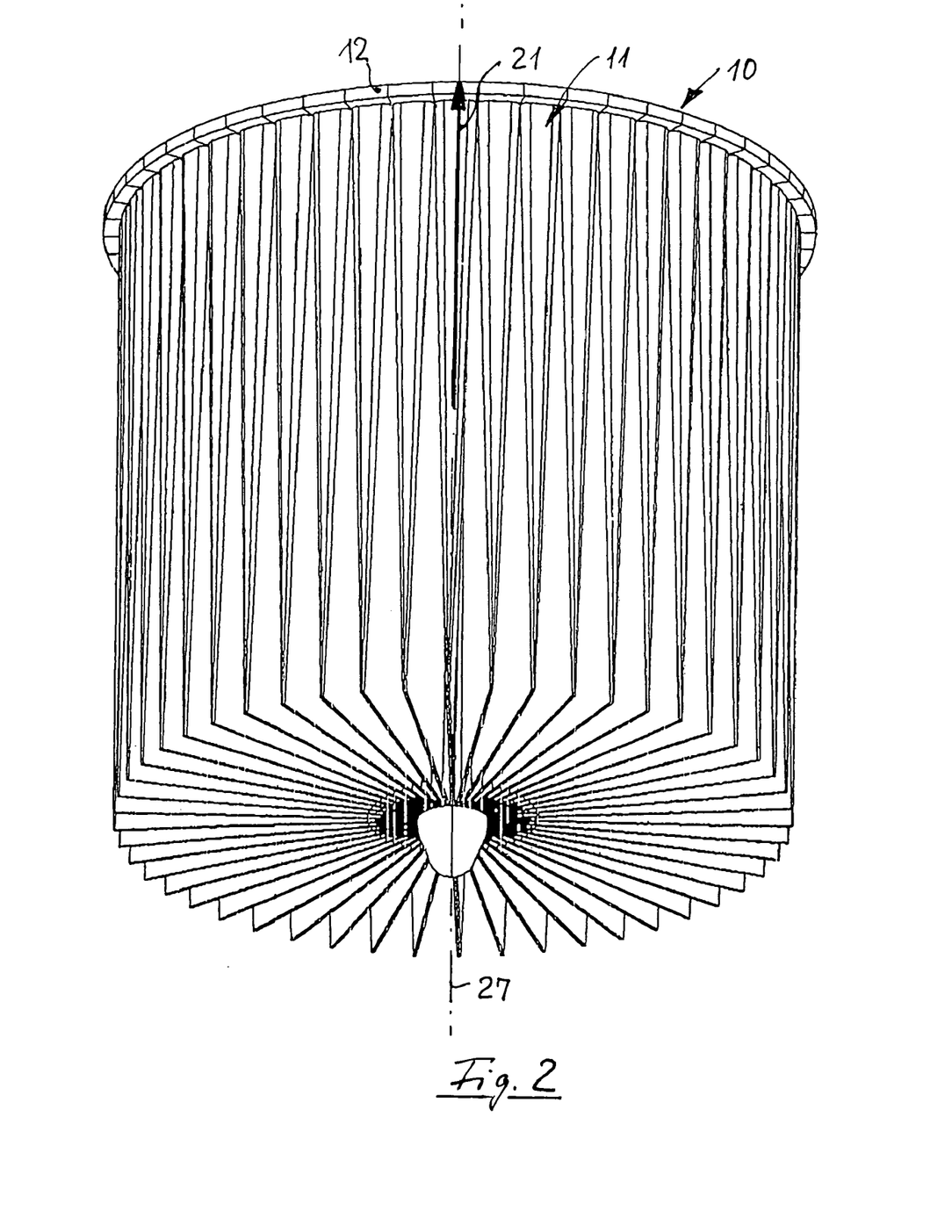
FIG. 2 is a perspective schematic representation of the filter body of a particle filter which operates with soot combustion and whose filter body consists of filter pockets of sinter metal.

A particle filter operating with soot combustion includes in accordance with the invention preferably filter areas of a sinter metal with a filter body 10 (FIG. 2) consisting of filter pockets 11. The filter pockets 11 have a triangular contour and have at least one, preferably two, adjacent wedge-shaped edges at filter ends, which extend at a right angle with respect to each other. FIG. 2 does not show the filter housing for the filter body 10, which is supported with its circumferential edge 12, which is disposed, with respect to the raw gas flow to the filter (arrow 13) and the clean gas flow from the filter (arrow 14), in the area of the dividing plane between the raw gas side and the clean gas side. In the area of this dividing plane are also the pocket openings 15 of the filter pockets 11 as apparent from FIG. 3. FIG. 2 shows that the filter body 10 consists of a plurality of filter pockets 11. Aside from the shown rotation-symmetrical configuration, oval shapes may be provided or filter contours whose diameter becomes smaller over part of the circumference for example by providing differently sized filter pockets 11.

The filter pockets 11 preferably have a support structure provided with passages, for example, preferably of a stretched metal lattice structure, onto which the porous metallic filter area is sintered. In this connection, it may be expedient to provide areas of the support structure for example junction areas of the stretched metal sheets as target areas for the radiation heaters forming the heat source, so that these areas form reflection areas, where a particularly intense heating of the soot deposits takes place. If desired the respective areas may be heated particularly intensely by providing them with a rough surface structure so that they form glow-points from where the soot combustion progresses.

The filter body 10 as shown in the embodiment presented herein comprises about 50 (fifty) filter pockets 11 disposed adjacent one another. Consequently, the radially outwardly opening wedge angle α is in a circular arrangement about 7°. The axial pocket length is designated by the letter L and is in the shown embodiment about twice the height H of the filter pocket 11 from the pocket opening 15. Herefrom, a wedge angle β opening toward the pocket opening 15 of about 3 to 4° is obtained. In the area of the pocket opening 15, the wedge back width B and consequently, the width of the back wall 17 of the filter pocket 11 in the area of the pocket opening 15 is about one eighth of the height H of the filter pocket 11. With respect to a filter body with about 60 (sixty) filter pockets 11, a radially outwardly opening wedge angle α of about 6° is obtained and an arrangement is expedient wherein the wedge back width B of the filter pocket 11 in the area of the filter pocket opening 15 is between a sixth and an eighth of the height H of the filter pocket 11.

In connection with the invention, particulate filters with carbon deposit combustion, particularly in an embodiment wherein the filter pockets 11 are grouped around a center essentially in a rotationally symmetrical or in an oval arrangement, have been found to be particularly expedient. The wedge-like filter pockets 11 have then a wedge back width B of 5 to 12 mm, preferably between 6 and 8 mm. Particularly advantageous are arrangements wherein a filter body 10 has filter pockets 11 with wedge back widths B of between 5 and 12 mm, especially 6 to 8 mm, wherein the number n of filter pockets 11 to the diameter D in mm of the filter body 10 is in the range of $$0.26 \times D < n < 0.52 \times D$$

In an analogous manner, this is also true for the filter bodies with non-circular circumference, which are not shown herein, if a filter area of equal size is taken for a filter body with circular or annular cross-section with a small core generated by the centrally converging filter pockets—and vice versa. In this way, different configurations of filter bodies can be provided by the use of wedge-like filter pockets according to the invention without the need for extensive research and testing expenditures.

Furthermore, particularly with a corresponding number of filter pockets 11, a wedge angle β has been found expedient in the range $1° < β < 4.5°$, particularly in connection with wedge filter pockets, in which the wedge back width B in the area of the filter openings 15 in relation to the filter length L has the following relationship:

$$10 < L/B < 80$$

particularly, $$10 < L/B < 60$$

Furthermore, it has been found that a determination of the total filter area F in relation to the maximum air flow mass flowing over the filter is expediently:

$$200 < m/F < 350$$

wherein the air flow mass m is defined in kg/h and the filter area F is defined in $m^2$.

A filter body 10 optimized in this way is also particularly advantageous with regard to its costs. In practice a medium size filter body is of particular interest. It is in the range of:

$$250 < m/F < 270.$$

A correspondingly constructed particle filter is particularly expedient for charged vehicle Diesel engines with a displacement of about 2000 $cm^3$, a maximum air mass flow of 450 kg/h and a filter area of 1.7 $m^2$, wherein about 60 filter pockets 11 are provided whose length L is about 250 mm and which have a wedge back width B of about 7 mm and a height H of about 60 mm.

Figure 3:
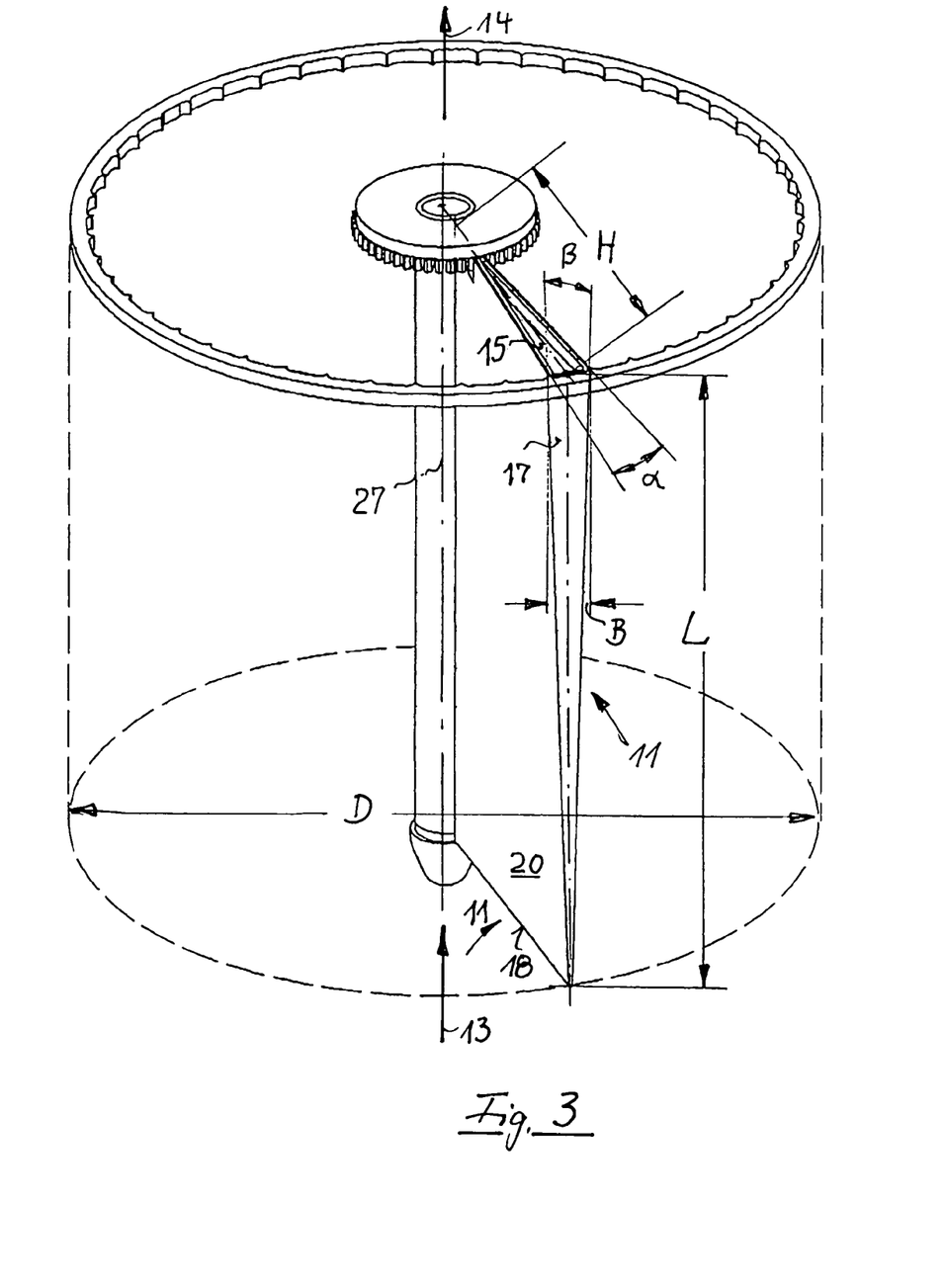
FIG. 3 shows a section of a filter body according to FIG. 2, wherein only one filter pocket is shown.

In the embodiment according to FIGS. 2 and 3, the filter pockets are joined to form a filter body 10, which includes a closed core so that the raw gas can be admitted only axially and radially inwardly.

However, within the scope of the invention the filter may have an open core for example by supporting filter pockets in the dividing plane between the raw gas side and the clean gas side at their radially inner and outer ends and with a raw-gas-side support structure only at the radially outer side so that, notwithstanding the converging radially inner ends of the filter pockets 11, a certain amount of gas can be admitted to the filter also from the radially inner core area.

FIGS. 2 and 3 show, in addition to the arrangement of the filter pockets 11 as already described, that opposite the front side of the filter, which includes the triangular pocket opening 15, the filter pockets converge to form wedge-like front edges 18 and that also the longitudinal end opposite the back wall 17 forms a quasi-wedge edge where the side walls 20 converge. In a plane view of the side walls 20, the filter pocket has a rectangular shape.

FIGS. 4 to 11 are highly schematic representations wherein FIGS. 4, 6, 8 and 10 show each a side wall 20, wherein only a partial length thereof extending toward the opening plane of the filter pockets 11 is shown. The longitudinal area of the filter pocket 11 corresponding to this partial length is symbolized in FIG. 2 by the arrow 21. Preferably, this longitudinal area of the filter pocket 11 corresponds about to half the length L of the filter pocket or it is smaller than half the length L of the filter pocket 11.

FIGS. 5, 6, 7, 9 and 11 each shows a schematic top view of two adjacent filter pockets 11 and indicates in a highly simplified manner the position of the radiation heating elements 22, which irradiate the respective side walls 20 and, respectively, the rear walls 17. They are formed in the embodiment according to FIGS. 4 and 5 by heating rods 23, particularly flat heating rods 23. The heating rods 23 are supported, for the purpose of illustration, in a housing 24 of the particle filter 5 in such a way that the energy can be supplied from without the housing 24 and, in this way, in a protected manner as indicated by the supply lines 25. The heating rods 23 extend each into the opposite chamber 26, which is delimited by adjacent filter pockets 11, and which, in accordance with the wedge shape of the filter pockets 11, becomes wider in the direction opposite to the raw gas flow that is, in the direction opposite to the arrow 13. The heating rods 23 extend in the radial direction with regard to the axis 27 of the filter body 10 essentially over the height of the filter pockets 11 at the outer part of the filter pockets 11 and the heating elements 22 extend over the length L of the filter pockets in the end area, which becomes narrower toward the plane of the pocket opening 15.

Figure 4:
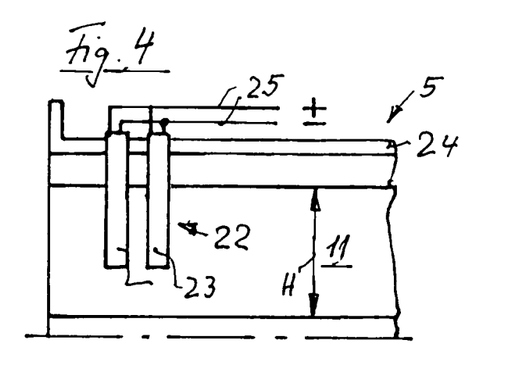
FIG. 4 and FIG. 5 show in a side view and a top view schematically the arrangement of heating elements relative to the filter pockets of a wedge filter according to FIG. 2 and FIG. 3, and FIGS. 6 and 7, 8 and 9 as well as 10 and 11 are representations in accordance with FIGS. 4 and 5, respectively, in connection with various additional embodiments and arrangements of heating elements in relation to the wedge pockets.
Figure 5:
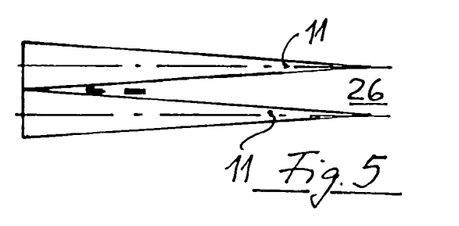
Figure 6:
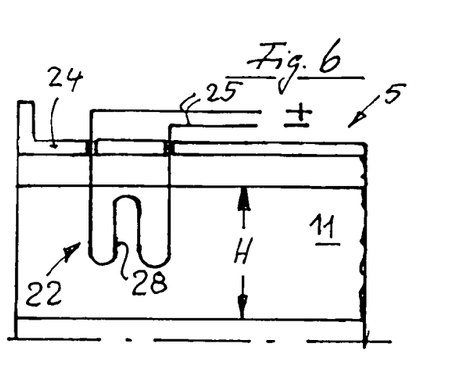
Figure 7:
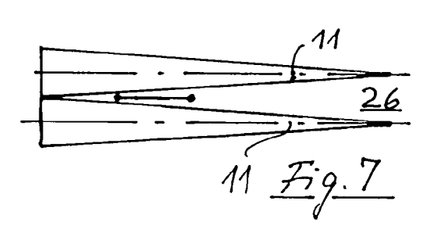

A corresponding embodiment is also shown in FIGS. 6 and 7, wherein a heating coil 28 is used as heating element 22 but otherwise the arrangement corresponds to that of FIGS. 4 and 5 and the description thereof.

Figure 8:
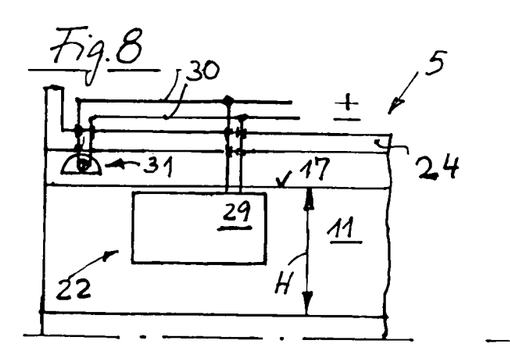
Figure 9:
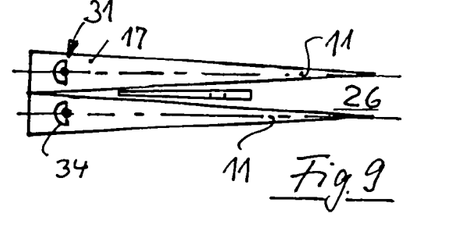

FIGS. 8 and 9 show additional embodiments of heating elements 22, wherein one heating element is in the form of a panel radiator 29, which extends in the longitudinal direction of the filter pockets 11 in the opposite chamber 26 defined between the filter pockets. A radial energy supply by way of supply lines 30 is provided possibly with a radial support structure. The heating element may however also be supported by a longitudinally extending support structure.

For simplicity reasons, the representation of FIGS. 8 and 9 includes an embodiment of a heat source 22 in the form of a radial radiator 31, which, contrary to the radiator panel 29, is not disposed in the opposite chamber 26 or extends into the chamber, but which is arranged at the circumference of the filter body 10, particularly opposite the rear wall 17 of a filter pocket 11, so that the rear wall 17 forms essentially the irradiated area. Here again, the arrangement shown serves only as a demonstration that the heating for the inflammation of the soot occurs particularly in the longitudinal end area of the filter body 10 converging toward the filter pockets 15.

Figure 10:
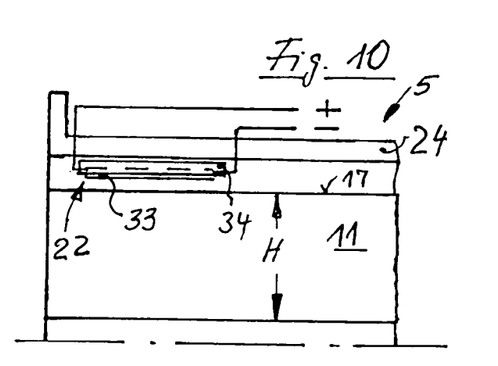
Figure 11:
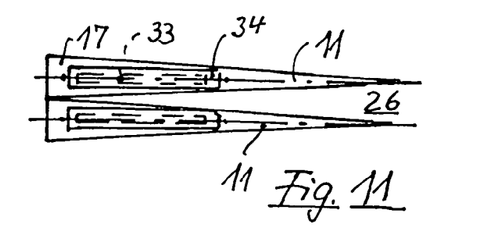

FIG. 10 shows a corresponding circumferential heat application preferably in the area of the rear wall of the filter pockets 11 toward which the heat source 22 is directed. In this case, the heat source 22 is formed by a rod-like radiator 33 in contrast to the radiator 31 in FIGS. 8 and 9, which is in the form of a point heat source, about analogous to a heat source formed by a laser. FIGS. 8 and 9 as well as FIGS. 10 and 11 show that the radiators 31, and respectively, 33, which are arranged each at the circumference of the respective filter pocket 11, may preferably be provided with a reflector 34 for focussing the respective radiation and, at the same time, shielding the housing 24. If appropriate, an embodiment may be provided, wherein the heat source forms a guide structure for the raw gas flowing toward the filter pockets 11. The arrangement of such a guide structure may protect the heating element 22 from impinging carbon particles and it may also serve as a center for the carbon deposition of the filter pockets in the irradiation area of the respective heat source 22.

The respective heat source 22 is activated in accordance with the invention only for short periods, for example, for a period of up to 3 minutes. Then continued soot or carbon deposit combustion occurs by progression of the glow or flame front in the carbon layer. With regard to favorable ignition conditions and also a continuous combustion by the progressing flames to cover the desired area, it has been found to be advantageous to adapt measures enhancing the ignition and/or the combustion for the ignition period or the combustion period. Particularly the combustion could also be controlled by way of such measures. For example, the raw gas may be heated by engine-internal procedures or an increased oxygen supply by admission of additional air. Correspondingly the combustion process can be slowed down or discontinued wherein also in this respect combinations of the individual procedures and measures described herein may be used.

The area subjected to the radiation heating is in accordance with the invention about 0.5–30% particularly 0.5 to 10% of the total filter area. As a result, the energy input provided overall by the electric heating for the carbon deposit combustion occurs only on a small to very small part of the filter surface with a correspondingly high power density and relatively small energy consumption. This becomes particularly apparent when, in accordance with the invention, the rear walls 17 of part of the filter pockets 11 are irradiated and the whole area subjected to the radiation is only 0.1 to 10%, particularly up to 4% of the circumferential filter area formed by the back walls 17 of all filter pockets 11 of the filter body 10.

What is claimed is:

1. A particle filter (5) with soot combustion for Diesel engines (1), comprising a filter body (10) having filter areas of sinter metal through which the engine exhaust gas is conducted from an upstream raw gas side to a downstream clean gas side, said particle filter including electric heaters (22) disposed at the raw gas side for heating selected filter areas and initiating combustion of the soot collected on the raw gas side of said filter areas by contact-free application of heat to selected filter areas, said filter body (10) comprising wedge-like filter pockets (11) having triangular openings (15) arranged in a common plane and, opposite said triangular openings (15), front edges (18) projecting in the upstream direction and triangular back walls (17) extending said common plane to said front edges at a circumference of said filter body (10), said pockets forming therebetween chambers which become narrower toward said opening plane (15) and also toward the area opposite said back walls (17), said electric heaters (22) being radiation heaters (31, 33) arranged so as to direct heat into the narrowing space between said filter pockets (11).

2. A particle filter according to claim 1, wherein said radiation heaters (31, 33) include reflectors (34).

3. A particle filter according to claim 1, wherein said radiation heaters (31, 33) and the filter surface areas exposed to the radiation heaters are in an area which is protected from the gas flow by shielding means.

4. A particle filter according to claim 1, wherein said radiation heaters (31, 33) supply heat to a sector of the filter body (10) which includes more than one filter pocket (11).

5. A particle filter according to claim 4, wherein several heating sectors are provided and arranged in circumferentially spaced relationship over the circumference of the filter body.

6. A particle filter according to claim 1, wherein the soot is combusted for predetermined areas in a time-shifted manner.

7. A particle filter according to claim 1, wherein said filter pockets (11) are grouped around a common center and the radiation heaters (31, 33) are arranged at the circumference of the filter body (10).

8. A particle filter according to claim 1, wherein the radiation heaters (23, 28, 29) extend into the spaces between the filter pockets (11).

9. A particle filter according to claim 1, wherein the heat energy applied to the filter body by said heat source (22), expressed as specific heat energy $P_{spec}$, based on the areas exposed to the radiation, is in the range of $$20 \leq P_{spec} \leq 100 \text{ kW/m}^2.$$

10. A particle filter according to claim 1, wherein the total area exposed to the radiation from the radiation heaters (31, 33) is 0.5 to 10% of the total filter area.

11. A particle filter according to claim 10, wherein the total area exposed to the radiation from the radiation heater is 0.1–10% of the circumferential filter wall defined by the back walls (17) of the filter pockets (11).

12. A particle filter according to claim 11, wherein the total area exposed to the radiation from the radiation heater is about 4% of the circumferential filter wall defined by the back walls of the filter pockets (11).

13. A particle filter according to claim 1, wherein radiation heaters (31, 33) assigned to different sectors of the filter body (10) are energized in a time-limited alternating fashion.

* * * * *